United States Patent
Yoo (12)

(10) Patent No.: US 8,563,062 B2
(45) Date of Patent: Oct. 22, 2013

(54) REDUCTION OF SORBIC ACID PRECIPITATION BY VOLUME CONTROL

(75) Inventor: Hyung S. Yoo, Northborough, MA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 13/034,023

(22) Filed: Feb. 24, 2011

(65) Prior Publication Data

US 2012/0219680 A1    Aug. 30, 2012

(51) Int. Cl.
*A23F 3/16* (2006.01)

(52) U.S. Cl.
USPC ..................................... 426/330.3

(58) Field of Classification Search
None
See application file for complete search history.

(56) References Cited

U.S. PATENT DOCUMENTS

| | | | |
|---|---|---|---|
| 3,021,219 A * | 2/1962 | Melnick | 426/310 |
| 4,399,150 A | 8/1983 | Ueno et al. | |
| 4,786,521 A * | 11/1988 | Bennett et al. | 426/658 |
| 5,888,569 A | 3/1999 | Jager et al. | |
| 2005/0053704 A1 | 3/2005 | Kemp | |
| 2007/0054026 A1 | 3/2007 | Grenville et al. | |
| 2007/0141203 A1 | 6/2007 | Cook | |
| 2009/0306210 A1 | 12/2009 | Behnam | |

FOREIGN PATENT DOCUMENTS

| | | |
|---|---|---|
| DE | 26 23 682 | 12/1976 |
| WO | 9721359 | 6/1997 |

OTHER PUBLICATIONS

Ashurst, Philip R., "Non-carbonated beverages" In Chemistry and Technology of Soft Drinks and Fruit Juices, Second Edition Edited by Philip R. Ashurst Copyright© 2005 by Blackwell Publishing Ltd, pp. 129-149.*
Database WPI Week 201063, Thomson Scientific AN 2010-L68981, XP002676321, dated Aug. 25, 2010.
PCT/US2012/025338, International Search Report and Written Opinion, dated May 31, 2012.

* cited by examiner

*Primary Examiner* — Humera Sheikh
*Assistant Examiner* — Subbalakshmi Prakash
(74) *Attorney, Agent, or Firm* — Banner & Witcoff, Ltd.

(57) ABSTRACT

A method for reducing sorbic acid precipitation in a volume of stable preserved syrup. A sorbate is dissolved in fluid having a temperature between about 150° F. and about 200° F. and is added to an agitated volume of bulk fluid having a temperature between about 150° F. and about 200° F. to form a sorbate-containing volume of fluid having a volume of at least 90 volume percent of the syrup volume. Acid is dissolved in fluid at a temperature of between about 150° F. to about 200° F. and added to the sorbate-containing volume to form the volume of stable preserved syrup.

20 Claims, No Drawings

US 8,563,062 B2

REDUCTION OF SORBIC ACID PRECIPITATION BY VOLUME CONTROL

FIELD OF THE INVENTION

The invention relates to a method for incorporating sorbic acid into beverages and beverage syrup. In particular, the method relates to a method for incorporating sorbic acid into beverages and beverage syrup while minimizing the potential for sorbic acid precipitation.

BACKGROUND OF THE INVENTION

Consumer demand for refreshing beverages has led to introduction of many types of beverages. Commercial distribution of beverages requires that the beverages, and syrup from which beverages are made, be protected from spoilage if not consumed or used upon manufacture.

Beverages can be maintained under conditions that significantly retard activity of microbial and other spoilage agents, such as bacteria, molds, and fungi. Such conditions often require, for example, refrigeration until the beverage or syrup is consumed. Maintenance of such conditions often is not possible or practical.

Another method of retarding microbial activity is to add preservatives to the beverage. Many preservatives are known. However, known preservatives typically have disadvantages that limit use in beverages. For example, preservatives may impart off taste to the beverage when used in a concentration sufficient to provide preservative effect. Preservatives also may adversely affect the appearance of the beverage.

Some preservatives precipitate or form crystals or a floc under conditions of manufacture or storage of a beverage or of a syrup from which a beverage is made. Some preservatives may cloud the beverage, which is unacceptable to the consumer if the beverage is expected to be clear. Such phenomena typically are unacceptable consumers not only because of certain preconceptions relating to appearance, but also because consumers often equate cloud or particulate formation with spoilage of the beverage. Floc, crystals, or sediment or sediment-like deposits in a beverage bottle also are unacceptable to consumers because of the solids typically taste bad and present an unpleasant mouthfeel (for example, a gritty or sandy mouthfeel).

Beverages often are made from concentrates that are diluted. Beverages then are provided immediately to a consumer, or are packaged for distribution and consumption. The concentrates, often called syrups, are conveniently shipped, and then used to make beverages in a one-step process. Thus, it is convenient to put all ingredients, including preservatives, into a syrup.

Thus, there exists a need for a preservative that does not form solids, such as floc, crystals, sediment or sediment-like deposits, or precipitates, in syrup. There also exists a need for a preservative that does not cloud an optically clear beverage.

BRIEF SUMMARY OF THE INVENTION

A first embodiment of the invention is directed to a method for forming a stable beverage syrup preserved with sorbic acid. In another embodiment of the invention, the stable preserved syrup has a shelf life of at least about three days at room temperature.

A third embodiment of the invention is directed to a method for forming a stable beverage preserved with sorbic acid. In another embodiment of the invention, the stable preserved beverage has a shelf life of at least about four weeks at a temperature between about 40° F. and about 110° F.

DETAILED DESCRIPTION OF THE INVENTION

As used herein, 'syrup' or 'beverage syrup' is a beverage precursor to which a fluid, typically water, is added to form a ready-to-drink beverage, or a 'beverage.' Typically, the volumetric ratio of syrup to water is between about 1:3 to about 1:8, more typically between about 1:4 and about 1:5. The volumetric ratio of syrup to water also is expressed as a "throw." A 1:5 ratio, which is a ratio commonly used within the beverage industry, is known as a "1+5 throw."

Sorbic acid and sorbates act as preservatives. However, at the pH levels typically found in syrups, and at a typical sorbate concentration in syrup sufficient to provide commercially useful preservative activity in beverages made therefrom, sorbic acid is likely to precipitate.

The inventors have discovered that precipitation of sorbic acid in syrup during manufacture of the syrup can be avoided by ensuring that the fluid temperature is relatively high, that neutral dry ingredients are pre-dissolved in high-temperature fluid, that the volume of fluid is at least 90 volume percent of the final syrup volume before the syrup is acidified, and the acids are added as a pre-dissolution high-temperature acidic fluid. Typically, flavors and other volatile components are added at lower temperatures, so the fluid temperature typically is lowered before flavors and volatile components are added. The flavored solution forms the syrup.

Thus, an embodiment of the invention is a method for manufacturing a beverage syrup comprising adding a solution of acids and acidic compounds of all types to a volume of aqueous solution comprising sorbate, wherein the volume of the aqueous solution is at least 90 volume percent of the final syrup volume. Typically, the volume before acidification is at least about 92 volume percent, and more typically is at least about 94 volume percent of the final syrup volume.

In embodiments of the invention, introduction of high-temperature sorbate-containing solution to high-temperature bulk water and formation of a high-temperature solution having a volume of at least 90 volume percent of the volume of the syrup before controlled acidification with vigorous agitation essentially precludes precipitation of sorbic acid.

Beverages made in accordance with embodiments of the invention typically comprise water, preservative (including sorbic acid), sweetener, pH-neutral compounds, acids and acidic compounds, and flavors and flavor compounds. These compounds typically include taste modifiers, nutrients, colors, and other compounds, such as emulsions, surfactants, buffers, and anti-foaming compounds, typically found in beverages.

As used herein, "beverage" refers to beverages such as soft drinks, fountain beverages, frozen ready-to-drink beverages, coffee beverages, tea beverages, sport drinks, and alcoholic products. The beverage may be carbonated or noncarbonated. In addition, in certain embodiments of the invention, "beverage" refers also to juice, dairy, and other non-clear beverages. Beverages according to embodiments of the invention can be clear or non-clear.

"Clear" refers to optical clarity, i.e., a clear beverage can be as clear as water. In a preferred embodiment of the present invention, the beverage concentrate and/or the finished beverage are clear as evidenced by a reading by a HACH Turbidimeter (Model 2100AN, Hach Company, Loveland, Colo.). Readings of up to about 3 NTU (Nephelometric Turbidity Units) are considered very clear, and values up to about 5 NTU can be considered clear. When such a reading is as high as around 6 to about 10 NTU, a sample is not clear, but rather very slightly hazy or slightly hazy. At about 15 NTU, a beverage is hazy. Thus, a beverage having turbidity not greater than about 5 NTU is said to be a clear beverage, with values of about 6 NTU being very slightly hazy to slightly hazy at 10 NTU.

As used herein, a "stable" beverage syrup refers to a syrup in which no phase separation occurs, i.e., no crystal, floc, sediment, haze, cloud, or precipitation at room temperature over a period of more than 3 days, and as long as 10, and more typically 20 weeks. As used herein, a "stable" finished beverage refers to a clear beverage in which no phase separation occurs, i.e., no crystal, floc, sediment, haze, cloud, or precipitation at room temperature at 40° F., 70° F., 90° F., and 110° F. over a period of 4 weeks, typically over a period of more than 20 weeks, and more typically more than 6 months, i.e., within the typical shelf-life of the finished beverage.

A "preserved" beverage shows no significant microbiological activity during the period of stability.

As typically used herein, 'water' is water, typically conditioned and treated, of a quality suitable for manufacturing beverages. Excessive hardness may induce precipitation of sorbic acid. With the guidance provided herein, the skilled practitioner will be able to provide water of sufficient quality.

"Fluid" means water and juice, dairy, or other liquid beverage products that form part of beverages. For example, dairy components may be added in quantity that does not provide sufficient hardness to induce sorbic acid precipitation. With the guidance provided herein, the skilled practitioner can determine whether addition of dairy, juice or other liquid beverage product is suitable for use in embodiments of the invention.

For brevity, the invention will be described as it relates to water as the fluid. However, the description herein also relates to fluid, as defined herein. With the guidance provided herein, the skilled practitioner will be able to provide fluids suitable for use in forming syrup.

In accordance with embodiments of the invention, syrup and beverages include preservatives. In particular, preservative includes sorbic acid, which typically is introduced as a sorbate, typically as alkali metal salts of sorbic acid. Typically-used alkali metals are sodium and potassium. In a more typical embodiment of the invention, potassium sorbate is used. Other preservatives are known to the skilled practitioner, and may be included with the sorbic acid. Other preservatives include, for example, antimicrobials such as the EDTA's, including disodium EDTA and calcium disodium EDTA, and benzoates, particularly the alkali metal benzoates; and antioxidants, including tocopherols, BHA, and BHT. With the guidance provided herein, the skilled practitioner can select appropriate preservatives.

The concentration of sorbic acid in the syrup typically is less than about 1300 wppm. In aqueous solution at pH of between about 2.5 and about 4 at about 20° C., which are typical storage conditions for syrup, sorbic acid precipitation begins at sorbate concentration of about 500 wppm, and at 1300 wppm, the tendency to precipitate is clear. Further, as the skilled practitioner recognizes, other compounds in the syrup also affect sorbic acid solubility adversely. For example, hardness lowers the solubility of sorbic acid. Therefore, addition of polysorbate in accordance with embodiments of the invention is contemplated at a wide range of sorbic acid concentrations.

The concentration of sorbic acid required to achieve commercial preservation conditions also relates to other conditions of the beverage and of the syrup. For example, carbonation will decrease the concentration of sorbic acid required to achieve a given preservation performance. In contradistinction, lowering the pH lowers the concentration of sorbic acid required to achieve a given preservation performance. With the guidance provided herein, the skilled practitioner will be able to establish a sorbic acid concentration that suitably preserves a syrup or beverage.

Sweeteners of beverage and syrup embodiments of the invention include caloric carbohydrate sweeteners, natural high-potency sweeteners, synthetic high-potency sweeteners, other sweeteners, and combinations thereof. With the guidance provided herein, a suitable sweetening system (whether a single compound or combination thereof) can be selected.

Examples of suitable caloric carbohydrate sweeteners include sucrose, fructose, glucose, erythritol, maltitol, lactitol, sorbitol, mannitol, xylitol, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, and glucose syrup.

Other sweeteners suitable for use in embodiments provided herein include natural, synthetic, and other high-potency sweeteners. As used herein, the phrases "natural high-potency sweetener," "NHPS," "NHPS composition," and "natural high-potency sweetener composition" are synonymous. "NHPS" means any sweetener found in nature which may be in raw, extracted, purified, treated enzymatically, or any other form, singularly or in combination thereof and characteristically has a sweetness potency greater than sucrose, fructose, or glucose, yet has fewer calories. Non-limiting examples of NHPS's suitable for embodiments of this invention include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I.

NHPS also includes modified NHPS's. Modified NHPS's include NHPS's which have been altered naturally. For example, a modified NHPS includes, but is not limited to, NHPS's which have been fermented, contacted with enzyme, or derivatized or substituted on the NHPS. In one embodiment, at least one modified NHPS may be used in combination with at least one NHPS. In another embodiment, at least one modified NHPS may be used without a NHPS. Thus, modified NHPS's may be substituted for a NHPS or may be used in combination with NHPS's for any of the embodiments described herein. For the sake of brevity, however, in the description of embodiments of this invention, a modified NHPS is not expressly described as an alternative to an unmodified NHPS, but it should be understood that modified NHPS's can be substituted for NHPS's in any embodiment disclosed herein.

As used herein, the phrase "synthetic sweetener" refers to any composition that is not found in nature and is a high potency sweetener. Non-limiting examples of synthetic sweeteners suitable for embodiments of this invention include sucralose, acesulfame potassium (acesulfame K or aceK) or other salts, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, and salts thereof.

Acids suitably used in embodiments of the invention include food grade acids typically used in beverages and beverage syrups. Buffers include salts of food grade acids that form pH buffers, i.e., provide a combination of compounds that tends to maintain the pH at a selected level. Buffers typically are added as a pH-neutral composition. Food acids for use in particular embodiments include, but are not limited to, phosphoric acid, citric acid, ascorbic acid, adipic acid, fumaric acid, lactic acid, malic acid, tartaric acid, acetic acid, oxalic acid, tannic acid, caffeotannic acid, and combinations thereof Flavors routinely used in beverages and syrups are suitably used in beverages and syrups that are embodiment of the invention. The skilled practitioner recognizes that some flavors will haze or add a cloudy appearance to a beverage. Therefore, such a flavor, which often may be an emulsion, would not be suitably used in a clear beverage. However, subject to this condition known to the skilled practitioner, known flavors suitably are used, as appropriate.

Suitable flavors include flavors typically used in beverages and syrup that are not incompatible with the type of beverage. That is, a clear beverage would not typically be flavored with a flavor that would cloud the beverage, introduce haze, or otherwise make the beverage less attractive to the consumer.

Any flavor, flavor compound, or flavor system consistent with the type of beverage suitably is used in embodiments of the invention. Further, the flavor may be in any form, such as powder, emulsion, micro-emulsion, and the like. Some of these forms may induce clouding in a beverage, and so would not be used in a clear beverage. Typical flavors include almond, amaretto, apple, sour apple, apricot, nectarine, banana, black cherry, cherry, raspberry, black raspberry, blueberry, chocolate, cinnamon, coconut, coffee, cola, cranberry, cream, irish cream, fruit punch, ginger, grand marnier, grape, grapefruit, guava, grenadine, pomegranate, hazelnut, kiwi, lemon, lime, lemon/lime, tangerine, mandarin, mango, mocha, orange, papaya, passion fruit, peach, pear, peppermint, spearmint, pina colada, pineapple, root beer, birch beer, sarsaparilla, strawberry, boysenberry, tea, tonic, watermelon, melon, wild cherry, and vanilla. Exemplary flavors are lemon-lime, cola, coffee, tea, fruit flavors of all types, and combinations thereof.

Surfactants also may be present in the syrup or beverage. Surfactant may be added as an ingredient of the syrup. The skilled practitioner recognizes that surfactant also may be introduced into the syrup or beverage as part of a component ingredient. Surfactants typically suitable for use in embodiments of this invention include, but are not limited to, the polysorbates (e.g., polysorbate 20, polysorbate 40, polysorbate 60, polysorbate 80), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers.

Beverage syrup is made in accordance with embodiments of the invention by adding a high-temperature pre-dissolution sorbate solution to a high-temperature bulk quantity of water. Any ingredients other than acids can be present in the pre-dissolution sorbate solution, another high-temperature solution, or the bulk quantity. Thus, embodiments of the invention may use only one pre-dissolution solution containing all the non-acidic compounds, or may use plural pre-dissolution solutions containing one or more non-acidic compound. With the guidance provided herein, the skilled practitioner can select the number of solutions used.

After the pre-dissolution sorbate solution, any other solutions of, for example, pH-neutral compounds, and liquid non-acid ingredients are added to the bulk water, the volume is increased, if necessary, to at least 90 volume percent of the final syrup volume by addition of water at high temperature. After volume adjustment, pre-dissolution acid solution at high temperature is added. The pre-dissolution acid solution is made by dissolving acidic components in water.

During formation of the high-temperature solutions and addition of the high-temperature solutions to the high-temperature bulk quantity of water, vigorous agitation is used. However, agitation should not be so vigorous as to entrain air into the fluids.

The pre-dissolution acid solution is added slowly to the bulk water volume. The rate at which the pre-dissolution acid solution is added is established to ensure that pockets of solution having low pH are not formed at the acid solution introduction point, to essentially preclude sorbic acid precipitation. Thus, the addition rate is related to the agitation intensity. With the information provided herein, the skilled practitioner will be able to establish a suitable agitation rate and a suitable pre-dissolution acid solution addition rate.

In some embodiments, flavors and flavor compounds are added just before completion of the syrup to minimize potential loss of volatile components and to minimize flavor loss in any form. Additional water or fluid may be added after other ingredients are added to 'top up' the solution, or to make the exact quantity or volume of syrup or beverage.

Other embodiments of the invention are directed to manufacture of ready-to-drink beverages. Such beverages are made by mixing an aliquot of syrup with an appropriate quantity of diluting water. Typically, the ratio of 1 volume of syrup with 5 volumes of water or other fluid, also known as a "1+5 throw", is used.

In embodiments of the invention, the bulk quantity of water, together with the quantity of solution containing sorbate and pH-neutral ingredients, comprises at least 90 volume percent of the volume of the syrup. Typically, the combined volume is at least about 92 volume percent, more typically at least about 94 volume percent.

The volume of the pre-dissolution sorbate solution and the volumes of other solutions added to the bulk quantity before acidification are established for manufacturing convenience. The skilled practitioner recognizes that the minimum practical solution volume is the minimum volume sufficient to dissolve the solid materials therein. With the guidance provided herein, the skilled practitioner can determine the relative proportion of the bulk fluid and sorbate-containing and other pre-acidification solutions to make up the at least 90 volume percent of the selected syrup volume.

The maximum temperature of the water, solutions, and fluids used in preparation of syrup or beverage in accordance with embodiments of the invention, is limited by the boiling point of water or solution-forming fluid, or of any component in the solution, or the temperature at which loss, by evaporation, vaporization, or otherwise, of any compound in the solution becomes unacceptably large. The maximum temperature of this water and of the resulting aqueous solutions often is less than about 200° F., and typically is less than about 190° F. To minimize the likelihood of sorbic acid precipitation, typical embodiments of the invention utilize the maximum temperatures achievable.

In accordance with embodiments of the invention, the temperature of water typically is at least about 150° F., more typically at least about 160° F., to ensure complete dissolution of the sorbate. In preferred embodiments of the invention, the water is at a temperature of at least about 170° F., and, in certain preferred embodiments, the water is at a temperature of at least about 180° F. The temperature of any other component is similarly selected. Further, if the quantity of an additional component is relatively small, say less than about 3 volume percent of the volume of the syrup, or is added after acidification, the importance of maintaining an elevated temperature is reduced, and lower temperature may be acceptable.

The skilled practitioner recognizes that the temperature of the syrup or beverage may be reduced after the product is complete, or after acidification and before volatile materials are added. For example, flavors and flavor components typically are maintained at temperatures that avoid loss of typically volatile components. Thus, flavors or flavor components, or other volatile materials, typically are added at an appropriate time and at an appropriate temperature. With the guidance provided herein, the skilled practitioner can identify an appropriate time to introduce flavor and other volatile materials.

The resulting syrup is packaged. Syrup may be used essentially immediately to manufacture beverages, typically packaged for distribution. Syrup may be distributed to bottlers, who package beverages made by addition of water and perhaps other materials like carbonation. Typically, the throw is 1+5. Syrup also typically is sold to those who mix the syrup with throw water, and perhaps other ingredients, such as carbonation, for immediate consumption. One example of such a preparation of a 'fountain soft drink.'

Syrup embodiments of the invention are stable beverage syrups preserved with sorbic acid having a shelf life of at least about three days at room temperature. More typically, syrup embodiments of the invention have a shelf life of at least about 7 days, and even more typically at least about 4 weeks.

Beverage embodiments of the invention are stable beverages preserved with sorbic acid having a shelf life of at least about four weeks at a temperature between about 40° F. and about 110° F. More typically, beverage embodiments of the invention have a shelf life of at least about 6 weeks, and even more typically at least about 16 weeks.

The following example illustrates, but does not limit, the invention.

Example 1

One hundred volumes of syrup, and beverages made therefrom using 1+5 throw, are made. About 80 volumes of water at a temperature between about 150° F. and 200° F. are charged to a first stirred tank and agitation is started.

About 10 volumes of water at a temperature between about 150° F. and 200° F. are added to a second agitated tank and high shear mixing is begun. Potassium sorbate in an amount of about 0.12 weight percent of the total weight of the syrup is added to the second tank and agitation is continued to dissolve the sorbate. All pH-neutral ingredients are added and agitation is continued to ensure thorough mixing and dissolution.

In a separate agitated tank, about 6 volumes of water at a temperature between about 150° F. and 200° F. is agitated and acids are dissolved therein. The solution is transferred slowly to the first tank, with the rate set to essentially preclude formation of pockets of fluid having low pH and, therefore, essentially preclude precipitation of sorbic acid. Agitation of the first tank is continued to ensure thorough mixing.

The temperature of the materials in the first tank is reduced to a temperature appropriate for addition of flavor.

Three volumes of lemon lime flavor and water are mixed and then added to the first tank with an additional volume of water. Additional top-off water required to achieve 100 volumes is added, if necessary, and agitation continues until the syrup is thoroughly mixed. The syrup then is cooled to ambient temperature.

Syrup thus prepared is a clear syrup for a fresh-tasting beverage. The syrup is stored at room temperature for 7 days. The syrup remains clear and without any solid precipitate, sediment, crystal, floc, cloud, or haze.

An aliquot of syrup thus prepared is diluted with 5 aliquots of throw water ("1+5 throw") to produce fresh-tasting lemon lime flavored clear beverage. The beverage is stored at room temperature for 16 weeks, and remains clear and without any solid precipitate, sediment, crystal, floc, cloud, or haze.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, the sorbate is sodium sorbate or a blend of sodium sorbate and potassium sorbate in embodiments of the invention.

I claim:

1. A method for reducing sorbic acid precipitation in a volume of stable preserved syrup, said method comprising
    (a) dissolving a sorbate in fluid having a temperature between about 150° F. and about 200° F. to form a pre-dissolution sorbate solution,
    (b) adding the pre-dissolution sorbate solution to an agitated volume of bulk fluid having a temperature between about 150° F. and about 200° F. to form a sorbate-containing volume of fluid having a volume of at least 90 volume percent of the syrup volume,
    (c) dissolving acid in fluid at a temperature of between about 150° F. to about 200° F. to form a pre-dissolution acid solution, and
    (d) adding the pre-dissolution acid solution to the sorbate-containing volume to form the volume of stable preserved syrup.

2. The method of claim 1, wherein the sorbate is selected from the group consisting of sodium sorbate, potassium sorbate, and blends thereof.

3. The method of claim 2, wherein the concentration of sorbic acid in the syrup is less than about 1300 ppm.

4. The method of claim 2, wherein the sorbate-containing volume of fluid has a volume of at least about 92 volume percent of the syrup volume.

5. The method of claim 4, wherein the sorbate-containing volume of fluid has a volume of at least about 94 volume percent of the syrup volume.

6. The method of claim 1, wherein temperature of the fluids is between about 150° F. and about 200° F.

7. The method of claim 3, wherein temperature of the fluids is between about 150° F. and about 200° F.

8. The method of claim 5, wherein temperature of the fluids is between about 150° F. and about 200° F.

9. The method of claim 7, wherein temperature of the fluids is between about 160° F. and about 190° F.

10. The method of claim 8, wherein temperature of the fluids is between about 160° F. and about 190° F.

11. A method for reducing sorbic acid precipitation in a stable preserved beverage prepared from a volume of stable preserved syrup, said method comprising
   (a) dissolving a sorbate in fluid having a temperature between about 150° F. and about 200° F. to form a pre-dissolution sorbate solution,
   (b) adding the pre-dissolution sorbate solution to an agitated volume of bulk fluid having a temperature between about 150° F. and about 200° F. to form a sorbate-containing volume of fluid having a volume of at least 90 volume percent of the syrup volume,
   (c) dissolving acid in fluid at a temperature of between about 150° F. to about 200° F. to form a pre-dissolution acid solution,
   (d) adding the pre-dissolution acid solution to the sorbate-containing volume to form the volume of stable preserved syrup, and
   (e) mixing the stable preserved syrup with fluid in a quantity sufficient to make the stable preserved beverage.

12. The method of claim 11, wherein the sorbate is selected from the group consisting of sodium sorbate, potassium sorbate, and blends thereof.

13. The method of claim 12, wherein the concentration of sorbic acid in the syrup is less than about 1300 ppm.

14. The method of claim 12, wherein the sorbate-containing volume of fluid has a volume of at least about 92 volume percent of the syrup volume.

15. The method of claim 14, wherein the sorbate-containing volume of fluid has a volume of at least about 94 volume percent of the syrup volume.

16. The method of claim 11, wherein temperature of the fluids is between about 150° F. and about 200° F.

17. The method of claim 13, wherein temperature of the fluids is between about 150° F. and about 200° F.

18. The method of claim 15, wherein temperature of the fluids is between about 150° F. and about 200° F.

19. The method of claim 17, wherein temperature of the fluids is between about 160° F. and about 190° F.

20. The method of claim 15, wherein the concentration of sorbic acid in the beverage is less than about 500 ppm.

* * * * *